(12) United States Patent
Keefer

(10) Patent No.: US 9,662,971 B1
(45) Date of Patent: May 30, 2017

(54) MOLDED FUEL TANK AND METHOD OF MANUFACTURING THE SAME

(71) Applicant: Neal Keefer, Portland, OR (US)

(72) Inventor: Neal Keefer, Portland, OR (US)

( * ) Notice: Subject to any disclaimer, the term of this patent is extended or adjusted under 35 U.S.C. 154(b) by 0 days.

(21) Appl. No.: 14/751,127

(22) Filed: Jun. 25, 2015

Related U.S. Application Data

(63) Continuation-in-part of application No. 13/711,188, filed on Dec. 11, 2012.

(51) Int. Cl.
 *B60K 15/03* (2006.01)

(52) U.S. Cl.
 CPC ............ *B60K 15/03177* (2013.01); *B60K 2015/03381* (2013.01); *B60K 2015/03493* (2013.01)

(58) Field of Classification Search
 CPC .. B60K 15/03117; B60K 15/03; B65D 90/22; B65D 11/08; B65D 25/005; B64D 37/32; B64D 37/06
 USPC ............ 220/560.01, 562, 601, 661; 264/310, 264/311, 271.1, 274, 275, 276, 278, 279
 See application file for complete search history.

(56) References Cited

U.S. PATENT DOCUMENTS

| | | | | |
|---|---|---|---|---|
| 3,158,383 A | * | 11/1964 | Anderson | B60P 3/2225 105/360 |
| 3,340,226 A | * | 9/1967 | Stivers | C07C 63/70 106/16 |
| 3,420,729 A | * | 1/1969 | Roberts | A47J 36/04 156/245 |
| 3,587,904 A | * | 6/1971 | Harris et al. | B29C 33/34 206/509 |
| 4,699,288 A | * | 10/1987 | Mohan | B29C 53/602 220/560.01 |
| 2008/0145582 A1 | * | 6/2008 | Spence | B29C 41/003 428/36.6 |
| 2009/0000686 A1 | * | 1/2009 | Tsutsumi | B32B 27/08 138/141 |

OTHER PUBLICATIONS

Federal Motor Carrier Safety Administration. "Part 393: Parts and Accessories Necessary for Safe Operation". https://www.fmcsa.dot.gov/print/regulations/title49/section/393.67, Citation from Sep. 24, 2013, Section 393.67 (d) and (e), Retrieved online on Jun. 6, 2016.*

* cited by examiner

*Primary Examiner* — Robert J Hicks
(74) *Attorney, Agent, or Firm* — Ingrid McTaggart

(57) ABSTRACT

One embodiment of a molded fuel tank includes a fuel tank molded from a synthetic material, such as a cross linked polyethylene polymer, wherein the tank meets all the safety requirements of the Federal Motor Carrier Safety Administration.

18 Claims, 2 Drawing Sheets

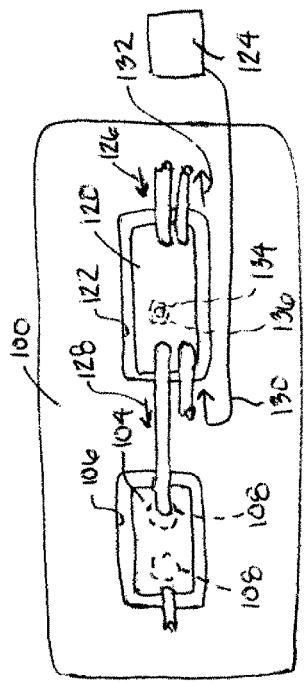
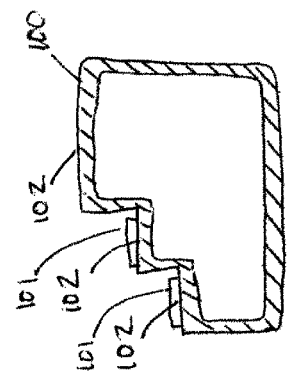
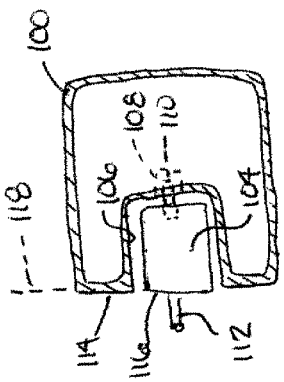
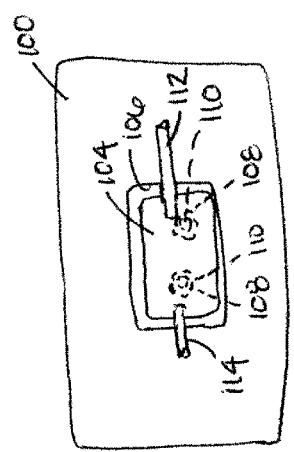

MOLDED FUEL TANK AND METHOD OF MANUFACTURING THE SAME

This application is a continuation in part (CIP) of U.S. patent application Ser. No. 13/711,188, filed on Dec. 11, 2012, which claims the benefit of U.S. provisional patent application Ser. No. 61/630,457, filed on Dec. 12, 2011, in the name of Neal Keefer.

BACKGROUND OF THE INVENTION

Truck fuel tanks typically are fabricated from multiple pieces of metal, such as steel or aluminum. The sheet of metal typically first is sheared to a rectangular shape, and then is punched or laser cut to form holes in the sheet. The sheet then is rolled into a cylinder, a "D" shape or a rectangular shape, and then welded along the longitudinal seam. The tank ends typically are formed from aluminum sheets which are welded to the built-up, i.e., rolled shell. In a final step, fittings for fuel fill, fuel drain, fuel vent, fuel suction and fuel return tubes are welded into place on the shell or on the tank ends.

This process has a number of challenges. One challenge occurs at the "T" weld joint, i.e., the location where the longitudinal seam and the circumferential seam head welds overlap. This location at the seam overlap region experiences a large number of leaks. Moreover, the overall process of welded metal fuel tank construction is very labor intensive Efforts to automate the welding process by using robotic welders has been somewhat successful in reducing the number of leaks in these tank. However, in general, tank manufacturers have a difficult time being commercially viable due to the capital intensity of the welding operation and due to the low price that the final product purchasers are willing to pay for the finished product.

There is a need, therefore, for a fuel tank with reduced probability of leaks and for a method of manufacturing a tank that is more cost effective.

SUMMARY OF THE INVENTION

One embodiment of a molded fuel tank includes a fuel tank molded from synthetic material, such as a composite polymer. One embodiment may include molding a fuel tank from synthetic materials, with metal components positioned within the fuel tank as it is molded. One embodiment may include molding a fuel tank and integral components simultaneously from synthetic materials. One embodiment of a molded fuel tank may include a fuel tank formed by a rotational molding process.

BRIEF DESCRIPTION OF THE DRAWINGS

FIG. 3 is cross-sectional side view of a fuel tank that includes steps molded integral therein.

FIG. 4 is a front view of a fuel tank that includes a recess molded integral within said tank, and having a device positioned within said recess.

FIG. 5 is a side view cross-sectional view showing a device positioned within a recess of the tank.

FIG. 6 is a front view showing two recesses molded integral within said tank, and having a device positioned within each of said recesses.

DETAILED DESCRIPTION OF THE PREFERRED EMBODIMENTS

One embodiment of the present invention includes a process of molding a one-piece fuel tank that contains all the components on the tank, i.e., molding the tank with the previously formed metal components already in place. The advantages of this method include fewer manufacturing process steps, fewer leak paths, reduced cost and, possibly, reduced weight of the manufactured fuel tank, when compared with prior art metal welded fuel tanks. In another embodiment the method may include molding a fuel tank with the components molded integral with the fuel tank during formation of the fuel tank. The use of a rotational molding process may allow fabrication of a fuel tank with molded metal fitting ports manufactured integral with the tank and within the polymer, eliminating subsequent welding operations. A rotational molding process may also allow fabrication of the fuel tank with synthetic material components manufactured integral with the fuel tank. Use of a molding process may allow the elimination of many of the currently used metal components by integrating threaded ports directly into the composite tank material. Another advantage of the use of a molding process may include fabrication of mounting bracketry integral with the tank during the molding process.

Figure 1:
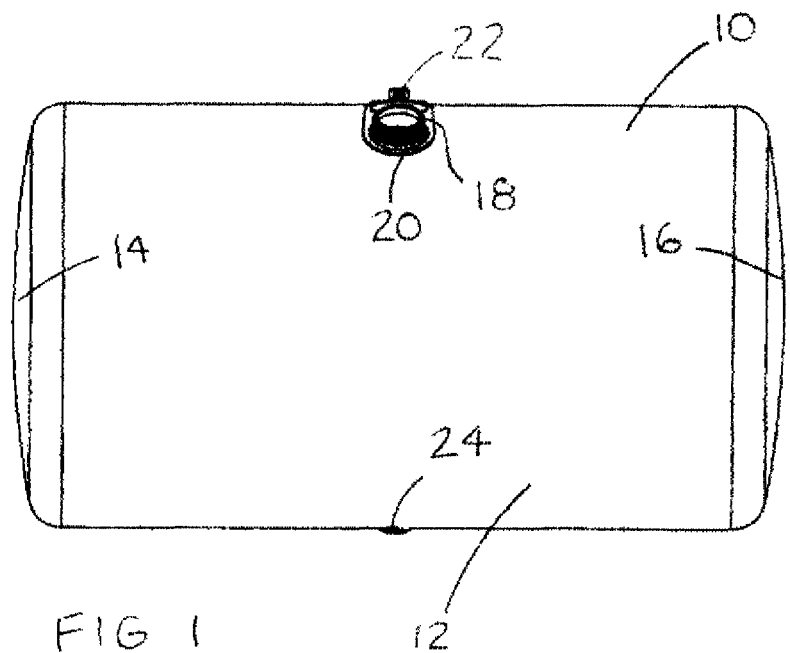
FIG. 1 is a side schematic view of a molded composite fuel tank.

FIG. 1 is side schematic view of a molded composite fuel tank 10 including a side wall 12 and first and second end walls 14 and 16. The tank 10 may include a flange 18 that may secure components thereon, such as a fuel filler neck 20 and a vent port 22, for example. Other components may be utilized in other embodiments. The tank may also include a drain port 24 on an underside thereof. The flange 18, the components secured thereon, and the drain port 24 may be manufactured of metal and secured to the composite material molded tank during or after formation of the tank. The flange 18, the components secured thereon, other components, and the drain port 24, may be manufactured of synthetic material and may be molded integral with the tank during formation of the tank and the components in a single process.

The tank and its attached components may be manufactured of any material, such as a synthetic material for example, during a molding process such as rotational molding. In this process a heated hollow mold is filled with a charge or shot weight of material. The tank is then slowly rotated (usually around two perpendicular axes) causing the softened material to disperse and stick to the walls of the mold. In order to maintain even thickness throughout the part, the mold continues to rotate at all times during the heating phase and to avoid sagging or deformation during the cooling phase. The rotational molding process may be s a high-temperature, low-pressure plastic-forming process that uses heat and biaxial rotation (i.e., angular rotation on two axes) to produce hollow, one-piece parts. The process does have distinct advantages. Manufacturing such large hollow fuel tank is much easier by rotational molding than previously known methods. Rotational molds are significantly cheaper than other types of molds. Very little material is wasted using this process, and excess material can often be re-used, making it a very economically and environmentally viable manufacturing process.

The rotational molding process may consist of four distinct phases:
1. Loading a measured quantity of synthetic material, such as a polymer in powder form, into the mold.
2. Heating the mold in an oven while it rotates, until all the polymer has melted and adhered to the mold wall. The hollow part should be rotated through two or more axes, rotating at different speeds, in order to avoid the accumulation of polymer powder. The length of time the mold spends in the oven is critical: too long and the polymer will degrade, reducing impact strength. If the mold spends too little time in the oven, the polymer melt may be incomplete. The polymer grains will not have time to fully melt and coalesce on the mold wall, resulting in large bubbles in the polymer. This has an adverse effect on the mechanical properties of the finished product.
3. Cooling the mold, usually by fan. This stage of the cycle can be quite lengthy. The polymer must be cooled so that it solidifies and can be handled safely by the operator. This typically takes tens of minutes. The part will shrink on cooling, coming away from the mold, and facilitating easy removal of the part. The cooling rate must be kept within a certain range. Very rapid cooling (for example, water spray) would result in cooling and shrinking at an uncontrolled rate, producing a warped part.
4. Removal of the part.

During the process the air temperature and the internal pressure in the mold may be monitored, allowing the part to be removed from the mold at a time to achieve desirable properties of the molded synthetic material.

The material used to manufacture the fuel tank may include materials from the polyethylene family: cross-linked polyethylene (PEX or XLPE), low-density polyethylene (LDPE), linear low-density polyethylene (LLDPE), medium-density polyethylene (MDPE), high-density polyethylene (HDPE), and regrind. Other compounds are PVC plastisols, nylons, and polypropylene. In particular, the fuel tank and components may be manufactured from Polyethylene, Polypropylene, Polyvinyl chloride, Nylon, Polycarbonate, Aluminum, Acrylonitrile butadiene styrene (ABS), Acetal, Acrylic, Epoxy, Fluorocarbons, Ionomer, Polybutylene, Polyester, Polystyrene, Polyurethane, and Silicone.

Figure 2:
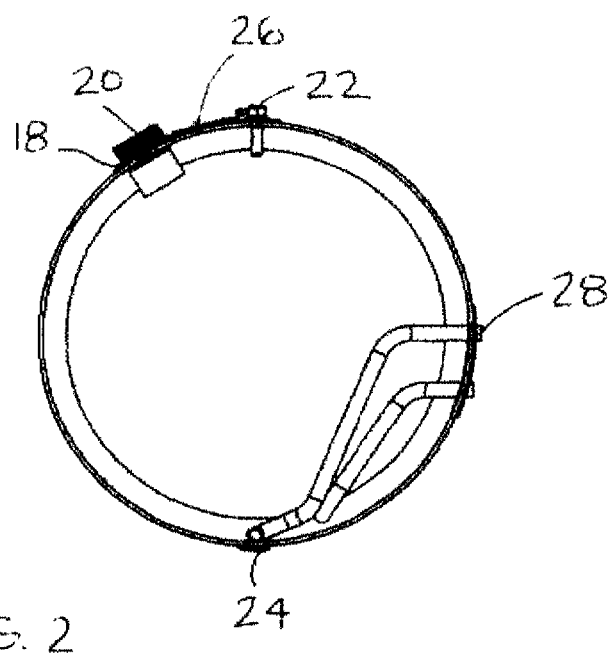
FIG. 2 is a cross-sectional side view of the fuel tank of FIG. 1 showing components secured within the molded fuel tank.

FIG. 2 is a cross-sectional side view of the fuel tank 10 of FIG. 1 showing components secured within the molded fuel tank. The flange 18, the fuel fill neck 20, a fuel level sender port 26, vent port 22, drain port 24, and a fuel supply and return tube assembly 28 (which may include a fuel supply tube and fuel return tube) may all be manufactured prior to manufacture of the tank and secured directly within the tank wall during manufacture of the tank 10, or secured to a boss that may be secured directly within the tank wall during manufacture of the tank 10. For purposes of this application, the term "fitting" may be used to describe a component secured directly within a tank wall, or a component secured to a boss that is secured directly within a tank. In such a process, the components may be secured within a mold and the tank molded around the components. In another embodiment, the components may be manufactured integral with a tank such that the tank mold includes regions for formation of the components simultaneously with the fuel tank itself. The components may be manufactured of any materials as may be suited for a particular process or application. In the embodiment wherein the components are manufactured integral with the fuel tank 10, the components will generally be formed of the same material as the fuel tank.

The molded fuel tank of the present invention meets all Federal Motor Carrier Safety Administration (FMCSA) safety requirements set forth in Part 393.67 for liquid fuel tanks. In one example embodiment the tank is manufactured by the process of rotational molding, or roto-molding, utilizing a cross linked polyethylene (XLPE) material. In one particular embodiment, the material is a cross-linked polyethylene. The material may include one or more additives, including: carbon black, elastomeric or rubber, or short-fiber fiberglass. In general, polyethylenes have a chemical formula $(C_2H_4)$—, where the value of "n" varies. The building block is $C_2H_4$ which is known as an ethylene monomer, i.e., a single molecule of ethylene, wherein multiple ones of these building blocks are bonded together in chains to create long-chain, high molecular weight polyethylene molecules. Cross-linking these long chains with one another creates bonds between adjacent long-chain molecules, which may result in a very strong and stable material while allowing for some flexing and memory properties. The amount of cross linking may vary by application, but cross linking at least 50 percent of the materials would provide a strong and stable product that may provide some flexibility. Cross linking 100 percent of the materials would provide a very strong and stable product. Cross-linking may generally be accomplished using one of two methods.

The first method of manufacturing an XLPE utilizes an organic peroxide based cross-linking method, which may be the most common method of manufacturing a XLPE, using one or more of the following initiator peroxides: Dicumyl peroxide; Di-t-butyl peroxide; Di-t-amyl peroxide; 2,5-dimethyl-2,5-di (t-butyl-peroxy) hexane; 2,5-dimethyl-2,5-di (t-butyl-peroxy) hexynes; N-butyl-4,4-bis(t-butyl-peroxy) valerate; 1,1-bis(t-butyl-peroxy)-3,3,5-tri methylcyclohexame; and, Benzoyl peroxide. Co-agents may be used along with the peroxides, including the following co-agents: Ethylene glycol dimethylacrylate; 1,3-butylene glycol dimethylacrylate; Poly (ethylene glycol) dimethylacrylate; and Trially cyanurate dimethylacrylate.

The second method of manufacturing an XLPE utilizes a silane based cross-linking, which may be a less common method of manufacturing a XLPE, using one or more of the following silanes: Tetramethoxysilane; Tetraethoxysilane; Methyltriethoxysilane; and, Methyl tris methyltriethoxysilane.

Cross-linking of polyethylene may also be accomplished through post-molding radiation processes. The end result of such a post-molding process still creates primary bonds between the long chains, but the radiation starts and accelerates the reaction instead of the use of chemicals.

The following may also be included in silane cross-linking: Vinyl trimethoxysilane; and Dibutyltin dilaurate. Carbon black may be added to the polyethylene to inhibit damage from ultraviolet light (UV). Ethyle vinyl acetate (EVA) may be blended with the polyethylene to enhance resistance of the XLPE to chemicals while in use. Elastomeric or rubber materials may be added to improve toughness. Short-fiber fiberglass may be added to improve flexural modulus or tensile modulus.

The FMCSA Liquid Fuel Tank Test specifies that each liquid fuel tank must meet the performance requirements of the tests specified in paragraphs (d)(1) and (2) of section 393.67. The most recent version of the FMCSA specification was revised on Sep. 24, 2013. A tank manufactured with Applicant's particular composition listed above meets the liquid fuel tank tests including the safety venting system test, the leakage test, the drop test and the fill-pipe test, as set forth in the Sep. 24, 2013, revised FMCSA regulations.

Accordingly, the molded fuel tanks of the present invention may be utilized on commercial motor carrier vehicles operated on U. S. roads and highways. The molded fuel tank of the present invention will be discussed with respect to each test in turn.

Safety Venting System Test:

The Safety Venting System Test required by paragraph (d)(1) of section 393.67 of the FMCSA states that a liquid fuel tank with a capacity of more than twenty five (25) gallons of fuel must have a venting system which, in the event the tank is subjected to fire, will prevent the internal tank pressure from rupturing the tank's body, seams, or bottom opening (if any). This test is carried out by requiring that the safety venting system of the fuel tank must activate before the internal pressure in the tank exceeds fifty (50) pounds per square inch (psi), gauge, and the internal pressure must not thereafter exceed the pressure at which the system activated by more than five pounds per square inch despite any further increase in the temperature of the fuel. The procedure to conduct this test includes filling the tank three-fourths full with fuel, sealing the fuel feed outlet, and inverting the tank. The procedure then includes, when the fuel temperature is between 50 degrees Fahrenheit and 80 degrees Fahrenheit, applying an enveloping flame to the tank for an extended period of time.

The molded fuel tank of the present invention, manufactured of the materials having the specific composition of materials listed above, and including a safety venting valve installed on a metal boss manufactured integral within the tank wall, (or any other type of device installed on a boss manufactured integral within the tank wall) will withstand the safety venting system test set forth above. For purposes of this invention, the device and/or the boss may be referred to as a fitting, wherein stating that the fitting is molded integral within a tank wall includes embodiments wherein the device itself is molded integral with a tank wall and embodiments wherein a boss in which the device is secured is molded integral with a tank wall. In particular, the tank of the present invention is manufactured of a cross linked polyethylene material wherein the tank wall itself and the interface between the tank wall and an integrally molded fitting or boss, will not rupture when the tank is subjected to an enveloping flame for an extended period of time.

Leakage Test:

The Leakage Test required by paragraph (d)(2) of section 393.67 states that neither a liquid fuel tank nor any fitting may leak more than a total of one ounce by weight of fuel per minute in any position the tank assumes during the test. The procedure for conducting this test includes filling the tank to capacity with fuel having a temperature between 50 and 80 degrees Fahrenheit. With the fill-pipe cap installed, turning the tank through an angle of 150 degrees in any direction about any axis from its normal position.

The molded fuel tank of the present invention, manufactured of the materials having the specific composition of materials listed above, and including a fill-pipe neck received in a boss molded integral therewith, will withstand the leakage test set forth above. In particular, the tank is manufactured of a cross linked polyethylene material such that the tank wall, and the interface between the tank wall and an integral molding fitting, will not leak regardless of the position in which the tank is placed.

Drop Test:

The Drop Test required by paragraph (e)(1) of section 393.67 states that neither a liquid fuel tank nor any fitting may leak more than a total of one ounce by weight of water per minute. The procedure for conducting this test includes filling the tank with a quantity of water having a weight equal to the weight of the maximum fuel load of the tank and dropping the tank 30 feet onto an unyielding surface so that it lands squarely on one corner.

The molded fuel tank of the present invention, manufactured of the materials having the specific composition of materials listed above, and including fittings secured within a boss molded within the tank wall, will withstand the drop test set forth above. In particular, the tank is manufactured of a cross linked polyethylene material such that the tank wall and the interface between the tank wall and an integral molded fitting, will not leak water when dropped squarely on the corner, onto an unyielding surface from a height of 30 feet.

Fill Pipe Test:

The Fill Pipe Test required by paragraph (e)(2) of section 393.67 states that neither a liquid fuel tank nor any fitting may leak more than a total of one ounce by weight of water per minute. The procedure for conducting this test includes filling the tank with a quantity of water having a weight equal to the weight of the maximum fuel load of the tank and dropping the tank 10 feet onto an unyielding surface so that it lands squarely on its fill-pipe.

The molded fuel tank of the present invention, manufactured of the materials having the specific composition of materials listed above, and including a fill-pipe secured within a boss molded within the tank wall, will withstand the fill-pipe test set forth above. In particular, the tank is manufactured of a cross linked polyethylene material such that the tank wall and the interface between the tank wall and an integral molded in fill-pipe, will not leak water when dropped onto its fill-pipe on an unyielding surface from a height of 10 feet.

Accordingly, the fuel tank of the present invention, rotationally molded using a material having the above listed composition, produces a fuel tank manufactured of a synthetic molded material that meets the U. S. Federal Motor Carrier Safety Administration safety requirements for fuel tanks. This has never been achieved before. Use of molded fuel tanks on carrier vehicles will provide for costs savings in materials during manufacturing the tanks due to the near elimination of metal in the manufacturing process, fuel savings due to the light weight of the molded fuel tanks when compared to prior art metal fuel tanks, and increased safety due to the increased resistance of the molded fuel tanks to puncturing, leakage, and rupturing, which may more readily occur with prior art metal fuel tanks.

FIG. 3 is one example embodiment of a cross-sectional side view of a tank 100 having steps 102 formed integral therein. In this embodiment, tank 100 may be mounted on the side of a tractor of an eighteen wheeler such that the tank itself may serve as the steps for the operator to gain access to the tractor cab. Moldings steps 102 integral with the fuel tank 100 may reduce the cost of manufacturing the truck itself because additional metal steps are not required and the labor to install such metal steps is eliminated. Additionally, labor to remove metal steps is eliminated when one desires to service the fuel tank. The XLPE material utilized to form tank 100 provides a strong and stable structure so that steps 102 may be formed integral with tank 100 to provide a strong a stable step structure that will support the load of an operator. The rotational molding process of the present invention provides a one-piece fuel tank including only a single layer wall construction, shown in the side cross-sectional view of FIG. 3.

Steps 102 may be formed as a part of tank 100 in a manner that steps 102 are designed to support a weight of, for example, 500 pounds, with a maximum deflection of a step 102 of three inches, which generally exceeds the weight of a carrier vehicle operator. In other embodiments, for example, steps 102 may be designed to support a weight of three hundred pounds with a maximum deflection of a step 102 of one inch, or one quarter of an inch, for example. The rotational molding process of the present invention allows a wide variety of weight and deflection specifications to be met without major changes to the production process. For example, a greater amount of material may be added to the rotational molder to produce a tank having a thicker side wall than a tank manufactured with less material, such that the steps of the tank may support a larger weight than a thinner walled tank.

Alternatively, the step structure may be molded integrally with the fuel tank and metal tread plates 101 may be attached to the steps. The tread plates offer improved traction for muddy or snow covered shoes and permit the mud or snow to pass through grated openings in the tread plates, keeping the traction surfaces of the tread plates clean and free of buildup of mud or snow which might hinder traction.

FIG. 4 is one example embodiment of a front view of a diesel exhaust fluid tank 104 placed on a diesel fluid tank 100 and within a diesel exhaust fluid tank receiving recess 106 of fuel tank 100. Large diesel carrier vehicles, such as diesel eighteen wheeled carriers, without a diesel exhaust fluid, may vent an exhaust stream of nitrogen oxides, which may be harmful to the environment. Nitrogen oxides are present in the exhaust stream in multiple species including nitrous oxide ($N_2O$) but also $NO_2$, $NO$, $N_4O$, $N_2O_3$, $N_3O_4$, $N_2O_5$, etc. All species are harmful pollutants and all are controlled by use of DEF and Selective Catalytic Reduction (SCR). To prevent the exhaust of nitrogen oxides from carriers, a diesel exhaust fluid (DEF) may be added to the carrier's exhaust stream to break down the dangerous chemicals discharged by the diesel engine. In one embodiment, the DEF fluid is a non-hazardous solution, such as a mixture of 32.5% urea and 67.5% de-ionized water. This urea/water blend is sprayed into the exhaust stream of the diesel vehicle to break down the dangerous nitrogen oxide emissions into harmless nitrogen and water. Most diesel carriers include a DEF tank mounted on the carrier's frame, and tubing that carries the DEF fluid from the DEF tank to the exhaust stream of the carrier's engine. Mounting a DEF tank to a carrier may include additional brackets and installation labor and may result in a non-stream lined profile of the diesel carrier.

In the embodiment shown, fuel tank 100 includes a diesel exhaust fluid tank receiving recess 106 in which a diesel exhaust fluid tank 104 is secured. In this manner, the DEF tank 104 is positioned close to the vehicle engine without protruding from the profile of the carrier, which results in a streamlined carrier profile. Moreover, mounting structure for the DEF tank may be molded integral with tank 100 such that the installation process of mounting the DEF tank 104 on the fuel tank 100 may be simple when compared to prior art mounting procedures. In particular, tank 100 may include press fit receiving mounting fittings 108 molded integral with tank 100, and DEF tank 104 may include press fit protrusions 110 molded integral therein such that tank 104 may merely be "snapped" into place within recess 106 of tank 100 by snapping protrusions 110 into fittings 108. Tank 104 may further include input and output piping 112 and 114 for the flow of DEF fluid into and out of tank 104, respectively. Alternatively, the DEF tank 104 may reside in recess 106 of tank 100 and be attached to tank 100 by bolts or screws passing through DEF tank 104 and being threaded into metal threaded bosses molded integrally with tank 100.

FIG. 5 is one example embodiment of a side cross-sectional view of a diesel exhaust fluid tank 104 placed within an exhaust tank receiving recess 106 of a fuel tank 100. In this embodiment, tank 100 and DEF tank 104 each include an external surface 114 and 116, respectively, positioned in a single plane 118, shown in side view, so as to provide a streamlined carrier profile.

FIG. 6 is one example embodiment of a front view of a fuel tank having two recesses formed in the side of the tank 100 for receiving multiple components therein. In one embodiment, the first component may be a DEF tank 104 and the second component may be a return fuel heat exchanger 120, positioned inside a recess 122, that may function to cool unused engine fuel being returned from a truck engine 124, shown schematically, to fuel tank 100. In this embodiment, one example cooling process may include the DEF fluid, such as a urea/water blend, flowing in a direction 126 into heat exchanger 120 at 100 degrees Fahrenheit, being heated within heat exchanger 120, and then flowing in direction 128 from heat exchanger 120 to DEF tank 104 at a temperature of 180 degrees Fahrenheit, for example. Diesel fuel returning from engine 124 may flow in direction 130 into heat exchanger 120 at 180 degrees Fahrenheit, being cooled within heat exchanger 120, and then flowing in direction 132 from heat exchanger 120 to an interior of fuel tank 100 at a temperature of 100 degrees Fahrenheit, for example. Heat exchanger 120 may be "snap fit" or "press fit" into recess 122 of tank 100, by example, by protrusions 134 on heat exchanger 120 that are received within fittings 136 molded integral with tank 100. Alternatively, the heat exchanger 120 may reside in recess 122 of tank 100 and be attached to tank 100 by bolts or screws passing through heat exchanger 120 and being threaded into metal threaded bosses molded integrally with tank 100.

In this embodiment, DEF tank 104 and heat exchanger 120 are both positioned within a recess, or recesses, of tank 100 such that the carrier vehicle defines a streamlined profile, thereby reducing drag on the vehicle and decreasing fuel costs. Additionally, DEF tank 104 and heat exchanger 120 may be used together to cool fuel returning to fuel tank 100 by heating the DEF fluid and cooling the returning fuel. Cooling of the returning fuel may be important in the use of synthetic, molded fuel tanks because such tanks may not include the heat conductive properties of prior art metal fuel tanks, such that heat dissipation from returning engine fuel may be desirable.

In the above description numerous details have been set forth in order to provide a more through understanding of the present invention. It will be obvious, however, to one skilled in the art that the present invention may be practiced using other equivalent designs.

I claim:
1. A synthetic fuel tank, comprising:
a one-piece tank body including only a single layer tank wall manufactured of a cross linked polyethylene material and having a fitting molded integral within a said single layer tank wall of said tank body, wherein said tank wall and an interface between said tank wall and said fitting molded integral with said tank wall, are impervious to rupture when said tank is subjected to an enveloping flame.
2. The tank of claim 1 wherein said tank wall and said interface between said tank wall and said fitting molded integral with said tank wall, are impervious to fluid flow there through at a rate greater than a total of one ounce by weight of fuel per minute, in all positions in which said tank is placed.

3. The tank of claim 1 wherein said tank wall, said interface between said tank wall and said fitting molded integral with said tank wall, and a corner of said tank, are impervious to fluid flow there through at a rate of more than a total of one ounce by weight of water per minute, when dropped squarely onto said corner on an unyielding surface from a height of 30 feet while filled with a quantity of water having a weight equal to a weight of a maximum fuel load of said tank.

4. The tank of claim 1 wherein said tank wall and said interface between said tank wall and a fill-pipe fitting molded integral with said tank wall, are impervious to fluid flow there through at a rate of more than a total of one ounce by weight of water per minute, when dropped onto said fill-pipe fitting on an unyielding surface from a height of 10 feet while filled with a quantity of water having a weight equal to a weight of a maximum fuel load of said tank.

5. The tank of claim 1 wherein said tank is subjected to said enveloping flame as described in FMCSA 393.67(d)(1), revised version 2013.

6. A synthetic fuel tank, comprising:
a one-piece tank body manufactured of only a single layer of a cross linked polyethylene material and having a fitting molded integral within a wall of said tank body, wherein said tank wall and an interface between said tank wall and said fitting molded integral with said tank wall, are impervious to fluid flow there through at a rate greater than a total of one ounce by weight of fuel per minute, in all positions in which said tank is placed.

7. The tank of claim 6 wherein said tank wall and said interface between said tank wall and said fitting molded integral with said tank wall, are impervious to rupture when said tank is subjected to an enveloping flame.

8. The tank of claim 6 wherein said tank wall, said interface between said tank wall and said fitting molded integral with said tank wall and a corner of said tank, are impervious to fluid flow there through at a rate of more than a total of one ounce by weight of water per minute, when dropped squarely onto said corner on an unyielding surface from a height of 30 feet while filled with a quantity of water having a weight equal to a weight of a maximum fuel load of said tank.

9. The tank of claim 6 wherein said tank wall, said interface between said tank wall and a fill-pipe fitting molded integral with said tank wall, are impervious to fluid flow there through at a rate of more than a total of one ounce by weight of water per minute, when dropped onto said fill-pipe fitting on an unyielding surface from a height of 10 feet while filled with a quantity of water having a weight equal to a weight of a maximum fuel load of said tank.

10. A synthetic fuel tank, comprising:
a one-piece tank body manufactured of only a single layer of cross linked polyethylene material and having a fitting molded integral within a wall of said tank body and a tank body corner, wherein said tank wall, said interface between said tank wall and said fitting molded integral with said tank wall, and said corner of said tank, are impervious to fluid flow there through at a rate of more than a total of one ounce by weight of water per minute, when said tank is dropped squarely onto said corner on an unyielding surface from a height of 30 feet while filled with a quantity of water having a weight equal to a weight of a maximum fuel load of said tank.

11. The tank of claim 10 wherein said tank wall, and said interface between said tank wall and said fitting molded integral with said tank wall, are impervious to rupture when said tank is subjected to an enveloping flame.

12. The tank of claim 10 wherein said tank wall, and said interface between said tank wall and said fitting molded integral with said tank wall, are impervious to fluid flow there through at a rate greater than a total of one ounce by weight of fuel per minute, in all positions in which the tank is placed.

13. The tank of claim 10 wherein said tank wall, said interface between said tank wall and a fill-pipe fitting molded integral with said tank wall, are impervious to fluid flow there through at a rate of more than a total of one ounce by weight of water per minute, when dropped onto said fill-pipe fitting on an unyielding surface from a height of 10 feet while filled with a quantity of water having a weight equal to a weight of a maximum fuel load of said tank.

14. A synthetic fuel tank, comprising:
a one-piece tank body manufactured of only a single layer of cross linked polyethylene material and having a fill-pipe fitting molded integral within a wall of said tank body, wherein said tank wall, and an interface between said tank wall and said fill-pipe fitting molded integral with said tank wall, are impervious to fluid flow there through at a rate of more than a total of one ounce by weight of water per minute, when dropped onto said fill-pipe fitting on an unyielding surface from a height of 10 feet while filled with a quantity of water having a weight equal to a weight of a maximum fuel load of said tank.

15. The tank of claim 14 wherein said tank wall and said interface between said tank wall and said fitting molded integral with said tank wall, are impervious to rupture when said tank is subjected to an enveloping flame.

16. The tank of claim 14 wherein said tank wall and said interface between said tank wall and said fitting molded integral with said tank wall, are impervious to fluid flow there through at a rate greater than a total of one ounce by weight of fuel per minute, in all positions in which the tank is placed.

17. The tank of claim 14 wherein said tank wall, said interface between said tank wall and said fitting molded integral with said tank wall, and a corner of said tank; are impervious to fluid flow there through at a rate of more than a total of one ounce by weight of water per minute, when dropped squarely onto said corner on an unyielding surface from a height of 30 feet while filled with a quantity of water having a weight equal to a weight of a maximum fuel load of said tank.

18. A synthetic fuel tank, comprising:
a one-piece tank body manufactured during a single rotational molding process to define a wall having only a single layer of a cross linked polyethylene material and having a fitting molded integral within a wall of said tank body, wherein said tank wall and an interface between said tank wall and said fitting molded integral with said tank wall, are impervious to rupture when said tank is subjected to an enveloping flame;
said tank wall and said interface between said tank wall and said fitting molded integral with said tank wall, are impervious to fluid flow there through at a rate greater than a total of one ounce by weight of fuel per minute, in all positions in which said tank is placed;
said tank wall, said interface between said tank wall and said fitting molded integral with said tank wall, and a corner of said tank, are impervious to fluid flow there through at a rate of more than a total of one ounce by weight of water per minute, when dropped squarely onto said corner on an unyielding surface from a height of 30 feet while filled with a quantity of water having a weight equal to a weight of a maximum fuel load of said tank; and said tank wall and said interface between said tank wall and a fill-pipe fitting molded integral with said tank wall, are impervious to fluid flow there through at a rate of more than a total of one ounce by weight of water per minute, when dropped onto said fill-pipe fitting on an unyielding surface from a height of 10 feet while filled with a quantity of water having a weight equal to a weight of a maximum fuel load of said tank.

\* \* \* \* \*

UNITED STATES PATENT AND TRADEMARK OFFICE
CERTIFICATE OF CORRECTION

PATENT NO. : 9,662,971 B1  
APPLICATION NO. : 14/751127  
DATED : May 30, 2017  
INVENTOR(S) : Keefer It is certified that error appears in the above-identified patent and that said Letters Patent is hereby corrected as shown below:

In the Claims

Column 8, in Claim 1, Line 4, after the term "within", the term --a-- is removed.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*